US006459683B2

United States Patent
Busuioc et al.

(10) Patent No.: US 6,459,683 B2
(45) Date of Patent: *Oct. 1, 2002

(54) COMMUNICATIONS NETWORK MANAGEMENT

(75) Inventors: Nicolae Marius Busuioc, Suffolk; Bharat Purohit, London; Ian Barry Crabtree, Suffolk; Jacob Yadegar, Middlesex, all of (GB)

(73) Assignee: British Telecommunications public limited company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/805,049

(22) Filed: Mar. 14, 2001

(Under 37 CFR 1.47)

Related U.S. Application Data

(62) Division of application No. 08/652,433, filed as application No. PCT/GB94/02613 on Nov. 30, 1994, now Pat. No. 6,226,273.

(30) Foreign Application Priority Data

Nov. 30, 1993 (EP) .............................................. 93309544

(51) Int. Cl.⁷ .............................................. H04L 12/16
(52) U.S. Cl. ...................................... 370/270; 370/444
(58) Field of Search ................................. 370/236–237, 370/242, 245, 252, 254–255, 270, 355, 377–384, 390–410, 420–426, 440, 432, 444; 709/223, 239, 240, 242

(56) References Cited

U.S. PATENT DOCUMENTS

| 4,642,758 A | | 2/1987 | Teng |
| 5,390,326 A | * | 2/1995 | Shah ........................... 370/222 |
| 5,634,011 A | * | 5/1997 | Auerbach et al. ............ 709/242 |
| 5,644,715 A | * | 7/1997 | Baugher ...................... 709/228 |
| 6,226,173 B1 | * | 5/2001 | Busuioc et al. .............. 370/270 |

FOREIGN PATENT DOCUMENTS

WO    WO A 93 16545    8/1993

OTHER PUBLICATIONS

Computer Communications, vol. 16, No. 2, Feb. 1993, Guildford GB, pp. 128–133, XP334815, Albanese.

* cited by examiner

Primary Examiner—Joe H. Cheng
Assistant Examiner—K. Nguyen
(74) Attorney, Agent, or Firm—Nixon & Vanderhye P.C.

(57) ABSTRACT

A communications network such as a Global Multi Service Network is provided with a management system which includes a distributed control system. The distributed control system is an open community of co-operating intelligent software agents which individually have control, or responsibility for managing, one or more nodes of the communications network. There are software agents of more than one type and the service management agents which have control over nodes of the network enter a negotiation process with customer agents in the provision of new services, so as to meet the constraints of both customer requirements and the interest of the relevant service provider. In the event of agent failure, the service management agents initiate a bidding process to reallocate the responsibilities of a failed agent.

9 Claims, 5 Drawing Sheets

COMMUNICATIONS NETWORK MANAGEMENT

RELATED APPLICATIONS

This is a division of application Ser. No. 08/652,433 filed Nov. 1, 1996 and allowed Nov. 20, 2000 and now U.S. Pat No. 6,226,273, which is a 371 of PCT/GB94/02613, filed Nov. 30, 1994.

BACKGROUND OF THE INVENTION

The present invention relates to communications networks and particularly to the management thereof.

Competitive advantage can be gained by communications network operators through the services that they offer and the efficiency with which they manage those services. Targets that a network operator might aim for include reduced charges, improved quality and increased customer control of services. Part of the networking infrastructure that might facilitate these customer offerings may well be the Global Multi-Service Networks (GMSNs) which enable network operators to offer their customers:

Rapid service provisioning

Controlled quality of service

Integrated services

Regulated control of network services

Ideally, these facilities will be offered with the same availability as voice connectivity is today but providing many new features together with mobility and movability of customers.

To enable network operators to offer their customers the extensive flexibility, quality and control the above demands, GMSNs will need to support:

Multi service provision

Multiple vendors

Multiple administrators

Flexible service management

The complexity and operational characteristics of GMSNs are expected to impose requirements beyond the capabilities of current network management approaches. Not only will the GMSNs have to provide services to the customer according to contract but price and performance will have to be optimized at the same time For the network operator.

A Multi-Service Network (MSN) is any network that is capable of supporting a range of services. The Pan-European Integrated Broadband Network investigated in a European PACE initiative, and referred to in the paper "Broadband Communication Management—The RACE TMN Approach" presented by R Smith at the IEE Broadband Conference in London in 1990, an example of a MSN based on the Asynchronous Transfer Mode. There are networks currently available in the USA which are examples of MSNs that use more conventional switches (e.g. DMS 250 from Northern Telecom). Such networks can be used to transmit voice as well as data. The data can be split into various transmission rates, for instance from 19 kbits/sec up to 40 Mbits/sec, so that a range of services from file transfer to real time video can be supported. Furthermore, the trend in such networks is towards global networks where the MSN can span many countries, hence the emergence of GMSNs.

Initially at least, the intended customers for MSNs are expected to be large corporate users, perhaps with many sites situated world-wide. Such a customer will require a network which appears to be a private switched network, providing at least the functionality that they enjoy from the international private leased circuits. In fact the service can be supported by a number of underlying networks, possibly from many different network operators. This arrangement is known as a virtual network.

Service Level Agreement (SLAs)

These companies often entrust a large proportion of their world telecommunications requirements to one service provider by contract. It is extremely important that they are provided with the level of service specified in their contract. The exact definition of the service is specified in a Service Level Agreement (SLA). The range of services available is potentially extremely large, and each service can be further customised since each service has a range of options. Example services include:

Dedicated international private eased circuits

Routing controlled by time of day calling identity originated location

Customer controlled dialing plans

An example of the latter is where a user needs only to dial 111 to get through to the relevant sales department, regardless of where the call is originated geographically in relation to the sales department.

A SLA can be expected in general to include:

Grade of Service (blocking probabilities, bit error rate, error free seconds etc.)

Target and guaranteed minimum provision times

Target and guaranteed minimum cessation time

Target and guaranteed minimum repair times

Target and guaranteed service availability

Working in object oriented software technology, models for services and SLAs have been developed by the International Standards bodies (OSI/NMF and CCITT). These provide Generic Managed Object classes that define services and SLAs. The concept of a feature Managed Object is introduced to define a component of a service that can be offered to the customer. The logical numbering scheme permitted in Intelligent Networks is an example of such a feature. Features can be "nested" so that one feature is a component of another feature. The mapping from the feature to the underlying network resources is also defined in the feature object. In an intelligent network of known type, having a structure including a service control point (SCP) (or other means) for making reference to service and/or customer data, the service control point (SCP) would typically be a resource or, which many features (i.e. logical numbering, time-of-day routing) depend.

Information about billing, fault handling and performance criteria may also be held within a feature, so long as it is common to all instances of that feature. It is possible for instance though that the performance criteria of some features will depend or, the use to which they are put.

A SLA is then defined in terms of the component features that support the service in question. In addition to this, information about the contract and a description of the service covered by the SLA is also kept. A SLA will typically refer to a number of features, which in turn may refer to other features and resources. To support this relationship a number of dependency relationship types can be defined (supports, depends-on etc).

Multi Service Network Management

The customer is also likely to require the ability to manage their own virtual network: services can be requested, altered and ceased by the customer from on-line connections to the service provider's equipment.

All this complexity makes network management an extremely difficult matter, particularly where reconfiguration is required, and particularly in the light of SLAs.

Providing Multi-Service capabilities across more than one country is likely to require considerable capital outlay. To make such a network viable the operating cost has to be kept within tight constraints. To meet this operating cost constraint, extensive automation of management functions in the network will be very attractive, if not essential.

According to embodiments of the present invention, this automation will be achieved at least in part through the use of Cooperating Intelligent Software Agent technology. The basis for such technology is described in general terms in various publications including:
i) "Distributed Artificial Intelligence" by M Huhns, Volumes I and II, published by Pitman, Morgan, Kaufmann in 1987;
ii) "Fundamentals of Distributed Artificial Intelligence" by D G Griffiths and B K Purohit, published in British Telecommunications Technology Journal, Volume 9 No. 3, in July 1991; and
iii) "The Role of Intelligent Software Agents in Integrated Communications Management" by D G Griffiths and C Whitney, in the same issue of the British Telecommunications Technology Journal.

The relevant content of each of the above is herein incorporated by reference.

Particular aspects of network management which might be automated by means of embodiments of the present invention, together or separately, include the establishment and restoration of routes in an underlying physical network while maintaining customer requirements satisfaction.

Long Term Service Provisioning

Service provisioning is a requirement of any telecommunications operator. Service provisioning for a GMSN tends to differ from conventional networks because of the following characteristics:
A large range of services
A wide range of customer types
Complex SLAs with financial penalties
Network(s) spanning more than one country It is likely to be a requirement that when a customer requests that a new service be provided, they should receive a quote and an indication of timescales within a fixed time. The customer ruts in a request for a new service (possibly via a management terminal for existing customers, or through a negotiator For new customers) and will expect to be told how much the service is acing to cost and when it can be made available. If the service cannot be supported by the existing network configuration then some reconfiguration is clearly required and many well involve the provisioning of new equipment.

Real-time Network Reconfiguration

When a network element fails, a number of services could be affected. They could fail completely or they could fail partially but their quality of service may drop below that defined in the customer SLA. When such faults occur, alternative ways (through network reconfiguration) must he found for re-establishing the same service.

In a conventional network (e.g. as provided to date in the UK PSTN) such reconfiguration is controlled by routing tables in the switch (e.g. System-X exchanges). The switch automatically attempts to re-route around problems in the network through control actions from a central operations unit. This routing takes no direct account of the type of traffic that is being routed and, as a result, all traffic is treated equally.

In a more complex network (such as GMSNs), where there is a wide range of services and a large number of different customer types, this simple approach is not so viable. It is no longer safe to assume that all network usage is of equal importance.

BRIEF SUMMARY OF THE INVENTION

According to the present invention, were is provided a communications network management system comprising a distributed control system based on cooperating intelligent software agents, wherein reconfiguration of either the communications network or of the agents can be carried out under the control of the agents.

Such reconfiguration would be triggered, for instance, by a request from a customer for a new service, or in the event of agent failure.

In the case of agent failure, in particular, it may be very important that the reconfiguration be carried out very fast so as to maintain or reestablish services. It will also be important that the control systems refer to SLAs to see which services have priority in the face of pending or actual failure. Thus when a network fault occurs all (or all significant) affected services need to be detected and the consequence these have on agreed SLAs investigated. The broken SLAs will be ranked in order of urgency and the network preconfigured to restore service in such a way that minimizes the consequences of the failure.

An embodiment of the present invention can be described as an open heterogeneous system architecture based on autonomous software agents working cooperatively to solve a sub-set of service management problems in a GMSN. The service management problems concerned might include the above mentioned real-time reconfiguration together with service provision in response to customer request.

BRIEF DESCRIPTION OF THE DRAWINGS

Embodiments of the present invention will now be described in more detail, by way of example only, with reference to the accompanying Figures, in which.

DETAILED DESCRIPTION OF EXEMPLARY EMBODIMENTS

Figure 1:
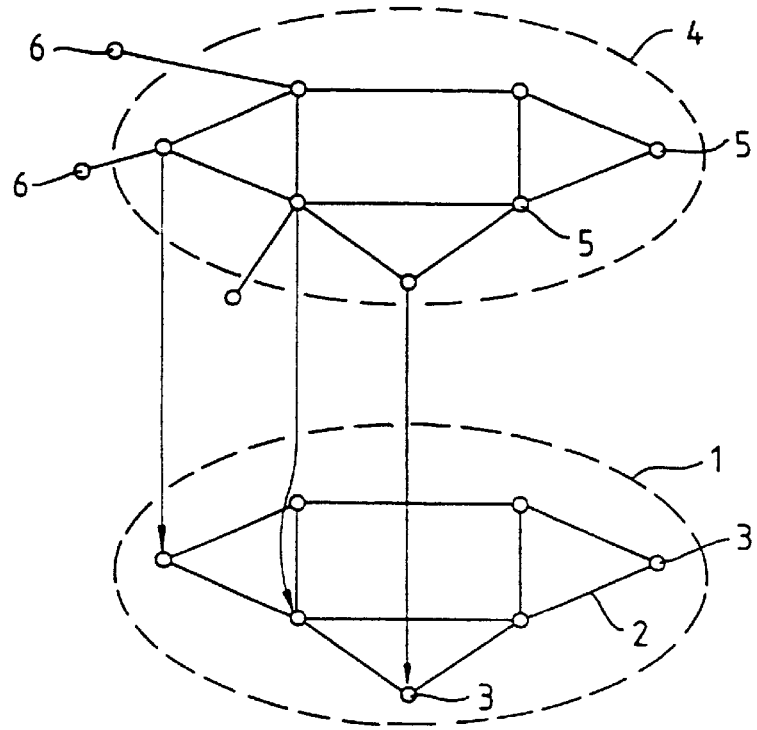
FIG. 1 shows a top level architecture for a GMSN together with a control network therefor.

Referring to FIG. 1, a GMSN 1 generally comprises communication links 2 between network nodes or switches 3. Communications occur along the communication links 2 in a combination determined by the configuration at the nodes 3.

The GMSN has an associated control network 4 comprising a plurality of computer systems, or software agents, 5, 6. The software agents 5, 6 are of two types, these being Service Management Agents (SMAs) 5, and Customer Agents (CAs) 6. Each. CA 6 is associated with a SMA 5 and acts to negotiate between a GMSN customer and a SMA 5 that might provide a service to that customer.

Software agents 5, 6 can enter or leave the community they form the control network for. The main functions performed by the agents 5, 6 are:

- establishment and restoration of communications links 2 in the underlying GMSN 1
- customer requirements satisfaction
- re-establishment of GMSN control in case of agent failure.

The establishment and restoration of links 2 is carried out by the SMAs 5 whereas customer requirements satisfaction is based on a process of dialogue and negotiation between a CA 6 and a SMA 5 acting as a service provider.

Notably, "manning" for service provision and customer service negotiation is performed in a context of incomplete knowledge and constraining requirements. Embodiments of the present invention provide processes for the solution of these problems, notable features of which processes are that they are distributed and resilient to failure. The distributed aspect supports improved performance over a centralised system as there is scope for reducing the total amount of data passed to a central point and the inherent resilience of the distributed system permits graceful degradation.

Conveniently, there may be one software agent, a SMA 5, situated at each of the GMSN nodes 3, each SMA 5 monitoring its underlying switch 3 as well as the links 2 extended to the switch 3. Primarily, each SMA 5 controls just one switch 3 cut any given SMA 5 has the ability to control a number of switches 3 simultaneously. That is, a SMA 5 is able to specify which incoming and outgoing communication links 2 a service will use.

The software agents 5, 6 form a single layered system. The SMAs responsibility is to provision customers services by means of the current network resources and to maintain the services already installed. That is, when a communication link 2 fails, all the services using that link 2 will be affected and will need to have a new route, or combination of links 2, allocated to them. The control network 4 of software agents 5, 6 performs these functions through cooperation since each has only local knowledge but must perform in a global context.

Agents' Architecture (a) Service Maintenance Agent (SMA) 5

Figure 2:
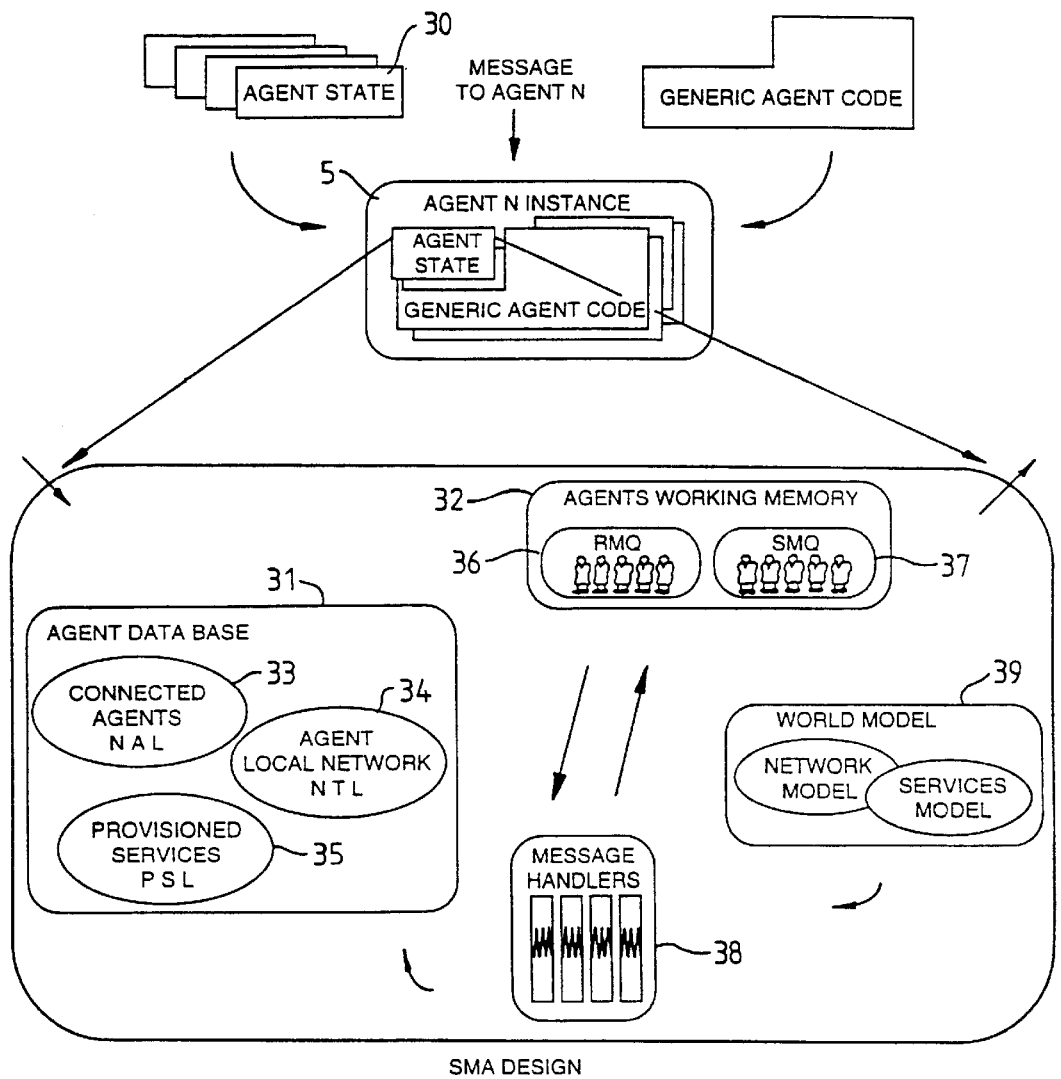
FIG. 2 shows the architecture of a software agent, specifically a service management agent 5, for use in the control network of FIG. 1.

Referring to FIG. 2, in order to play its role within the control network 4, each SMA 5 has to have well structured knowledge and the capability to use that knowledge in cooperating with other agents 5, 6. Acting in a dynamically changing environment, a SMA 5 may evolve through various states 30. A state 30 is defined as an instance of agents knowledge, created as a result of the agent's interaction with the physical environment and/or contact with other agents. The SMA's knowledge may be partitioned into two categories, the agents database 31 and the agent's working memory 32. The agent's database 31 carries descriptions of neighbouring agent's topology 33, local network topology 34 that the relevant agent 5 is responsible for and a traffic profile 35. This latter describes services already installed which use the agents local network. The agent's working memory 32 consists mainly of queues of messages received 36 and sent 37 by the agent, which queues 36, 37 arise during: the solving of network problems.

Additionally, each SMA 5 has a set of "message handlers" 38 that enable the agent's methods and algorithms (Generic Agent Code) to be triggered and used appropriately for each type of message. The Generic Agent Code includes:

- the agent's knowledge evaluation and updating algorithm
- a distributed routing algorithm
- a customer service negotiation algorithm
- a "bidding" mechanism for use in reallocating control in the case of agent failure.

The agent's database 31 is constantly updated during an agent's existence and is enhanced through contact with neighbouring SMAs 5 during problem solving sessions. Based on the messages it receives, such as alarms, partial route results, confirmation and reservation of circuits along a route in order to install a service, etc, each SMA 5 builds its own model 39 of the GMSN 1 and the services running on it.

(b) Customer Agent (CA) 6

Figure 3:
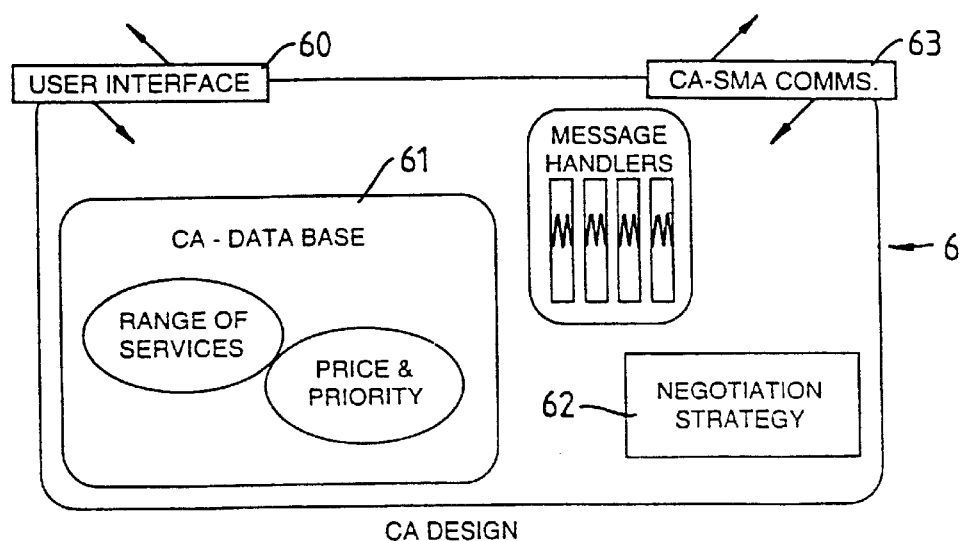
FIG. 3 shows the architecture of a software agent, specifically a customer agent 6, for use in the control network of FIG. 1.

Referring to FIG. 3, in order to satisfy a customers requirements for a service, a second type of software agent, the CA 6, is provided. Each CA 6 is coupled with a SMA 5 and comprises, as a minimum subset, the following:

- a friendly user-interface 60
- a data base 61 containing information about the range of services offered on the GMSN 1, tariffs and priorities
- a strategy for negotiation 62
- CA-SMA communication protocol 63

The user interface 60 permits dialogue with a customer so as to achieve customer requirements capture, provision of advice to the customer, for instance, on services, tariffs etc, customer/service provider mediation and accommodation of customer decisions such as change/modify requirements and solution acceptance.

The services database 61 contains information about the range of services that might be offered by a service provider on the GMSN 1 and other information reflecting that provider's tariffs policy. It is updatable.

The strategy for negotiation 62 may be implemented in either of at least two ways. Firstly, this might be by mediation between the customer and the service provider, the customer taking all decisions. Alternatively, the customer might provide the service requirements and cost range he/she is able to accept, giving the CA 6 the freedom to negotiate for the best available service to satisfy those requirements and cost range.

The embodiment described below is an implementation which follows the first approach, the customer taking all the decisions and the CA 6 mediating between the customer and the service provider. The CA 6 acts in the interest of the customer who requires a service, and the customer may simply request the highest possible quality and priority, for minimal cost. The mediation requirement arises because the service provider, represented by a SMA 5, wants to establish the service using the minimum of network resources at minimum operating cost. A dialogue therefore arises between the CA 6 and a relevant SMA 5 to reach a mutually acceptable agreement. This is carried out by the process of agent negotiation described in the following section.

Customer Service Provision through Agent Negotiation

Before describing service provision in response to customer request, it is important to see how a service is modelled in the present embodiment of the invention, and to know the main assumptions made about the services. The service definition is as follows:

Service=(ServiceName, Cost, Priority, Bandwidth, Source, Destination)

Optionally, the service definition might also include "Quality of Service".

Notably the service parameters Cost, Priority and Bandwidth are reconsidered and may be altered during the negotiation between a SMA 5 and a CA 6, prior to service acceptance and installment. This is further described later.

The service assumptions are as follows:
- a service is an end-to-end connection with a single path. No broadcast services are considered
- services are considered to be bi-directional, that is, traffic flows in both directions along the provisioned path
- a service band-width is expressed in terms of the number of circuits required
- a service band-width is constant, that is, not varying along its path or with time of day
- services are prioritised on the basis of a priority number that is determined beforehand (through negotiation) and never changes whilst the service is in operation
- the priority of a service is directly proportional to its selling price
- a lower priority service may be temporarily disturbed if another service with a higher priority requires some of the resources taken up by the lower priority service. This is necessary to form a cost effective route for the new service.

On receiving a customer request for a new service, the CA 6 matches it against the range of available services offered by the service provider and builds a service specification which is handed over to the SMA 5 responsible for the source node for that particular service. The specification or the requested service takes the following form:

Customer-Request=(ServiceName, Cost*, Priority*, Bandwidth*, Source, Destination)

where * denotes initial value for those parameters.

Again, optionally, the specification may include "Quality of Service".

When the SMA 5 responsible for the relevant source node receives the Customer-Request to provide a service, it will need to cooperate with the other SMAs 5 to find the most cost effective route from source to destination. The SMA 5 who will be the service provider to the customer in this context takes the Customer-Request and either initiates the process of generating routes or puts an entry in a pending queue of entries corresponding to each Customer Request and triggers a "watchdog" time-out to limit the total time waiting for a response.

When the process of generating a route in initiated, route generation is done by using a distributed routing algorithm, examples of which are known and hence not described in detail herein. Networks such as the one under consideration must be regarded as dynamic. That is, nodes and links may be added to or deleted from the system and capacity on any link may vary. The inclusion and handling of these constraints require algorithms that are highly adaptive to changes. It is to meet these requirements that a distributed routing algorithm to be performed by agents is found attractive.

A distributed routing algorithm can for instance involve exploring all paths but at the same time each SMA 5 involved in developing a set of route(s) holds the cost of the least costly route so far developed and handed down to it via a forward message by another SMA 5. The SMAs would then compare the cost of partial routes being developed with that of the least costly route held. If a partial route is more expensive it is abandoned as it certainly does not lead to a cost effective route. Otherwise, it proceeds to reach completion (towards reaching the destination) at which stage a backward message is directed along the route to the SMA 5 that initiated the search.

The network of SMAs 5 thus goes into action to find a set of routes to satisfy the request entries and to return back to the SMA 5 who has become the service provider the prospective routes. Any of these routes may have the following structure:

Route-Result=(Free-Cap, Cost, [$N_1, \ldots, N_j$], [($S_i, P_i$), \ldots, ($S_k, P_k$)])

where "Free-Cap" is the global free capacity along the route and "Cost" is simply the cost for that route.

Referring to FIG. 1, each network node 3 might be separately numbered $N_1, N_2, N_3$ etc. Hence a route through the GMSN 1 can be expressed by listing the relevant nodes 3 through which the route will pass. An example may thus be a route [$N_1, N_5, N_3, N_3$]. Hooking at capacities available on the route links, that is free capacities, these might be as follows:

Link-Cap$_{15}$=30, Link-Cap$_{58}$=50, Link-Cap$_{83}$=20

Free-Cap=min (Link-Cap$_{15}$, Link-Cap$_{58}$, Link-Cap$_{83}$)=20

[$N_1, \ldots, N_j$] is the route given as a list of nodes 3 from the source ($N_1$) to the destination ($N_j$)

[($S_i, P_i$), \ldots, ($S_k, P_k$)] is a disruption list, that is, a list of all the services ($S_1$) with their priorities ($P_1$) that might be disrupted if the proposed new service were installed along that route.

The prospective routes are subsequently listed in descending order with respect to Free-Cap. It should be noted that each route in the list necessarily satisfies Source and Destination entries in the associated Customer-Request. It also necessarily satisfies Cost entry (Cost*$\geq$Cost).

It may be that the first route in the list (the one with the maximum Free-Car) satisfies:

Free-Cap$_i \geq$ Bandwidth*

In this case no other services need to be disrupted (the disruption list should be empty) and the load of the network with services is kept under control since the route with the maximum available capacity is to be chosen. Then SP gets the particular route Route, and sends a message to the CA 6 informing it about this route in order to obtain the customer agreement to install the service on that particular route.

If on the other hand

Free-Cap$_i$<Bandwidth* then a process of negotiation starts between the CA 6 and SP.

If none of the routes has enough Free-Cap to satisfy the bandwidth required, the SP representing the company interest uses a decision function to choose the optimal route on which services may be disrupted. This decision function is described below.

For Route$_i$, i=1, \ldots, n, SP computes:

$$M_i = \frac{\left(\sum_{i=1}^{k} P_i\right) - \text{priority}}{k} \quad i = 1, \ldots, n \quad \text{(Eq: 1)}$$

where, as pointed out above ($P_1, \ldots, P_k$) are priorities of services ($S_1, \ldots, S_k$) that must be disrupted if Route$_i$ is to be established. $M_1$ is the average net priority loss per service if services ($S_1, \ldots, S_k$) are to be disrupted.

It is rational to pick the route that minimizes $M_1$. SP, therefore, initiates a loop that linearly searches through this list to have the route with minimum $M_1$ such that Priority>$P_t$, for any value of t from 1 to k, ie $\forall_{t=1,\ldots,k}$ (Relation **)

If it does exist then services may be temporarily disrupted and the CA 6 is informed about the route chosen, waiting for the customer agreement to install the service.

At this point it is important to add that in this implementation the SMAs 5 responsible for the links of the route that carry the services to be disrupted identify those services automatically and try to find alternative routes (route restoration) for them, if possible. If not, the SMA may renegotiate with the CA responsible for the disrupted services. This is to minimise the loss of revenue caused by the disruption of the lower priority services.

Otherwise, SP presents to CA its best option (the route having the minimum $M_t$) and at this point the customer may agree to lower his bandwidth requirement and accept the free-capacity available on the proposed route. If the customer accepts the above deal his service is installed along the route with no disruption and therefore at no extra cost.

Otherwise if the customer wants to keep his bandwidth requirements in force, SP negotiates with CA on the basis of increasing the required service priority (Priority*). Priority may for instance be directly proportional to cost. For a higher priority service CA is expected to pay more.

If CA accepts a new higher priority, the SP computes the extra cost that the customer needs to pay based on the average priority loss ($M_t$). The total cost of the service which is:

Total Cost=Cost*+ExtraCost reflects the increase of priority level

Priority=Priority*+ExtraPriority

The ExtraPriority is the amount to be added to Priority* in order to satisfy "Relation **" given above. Then the same mechanism, for route restoration, described above, is applied for the disturbed services.

Figure 4:
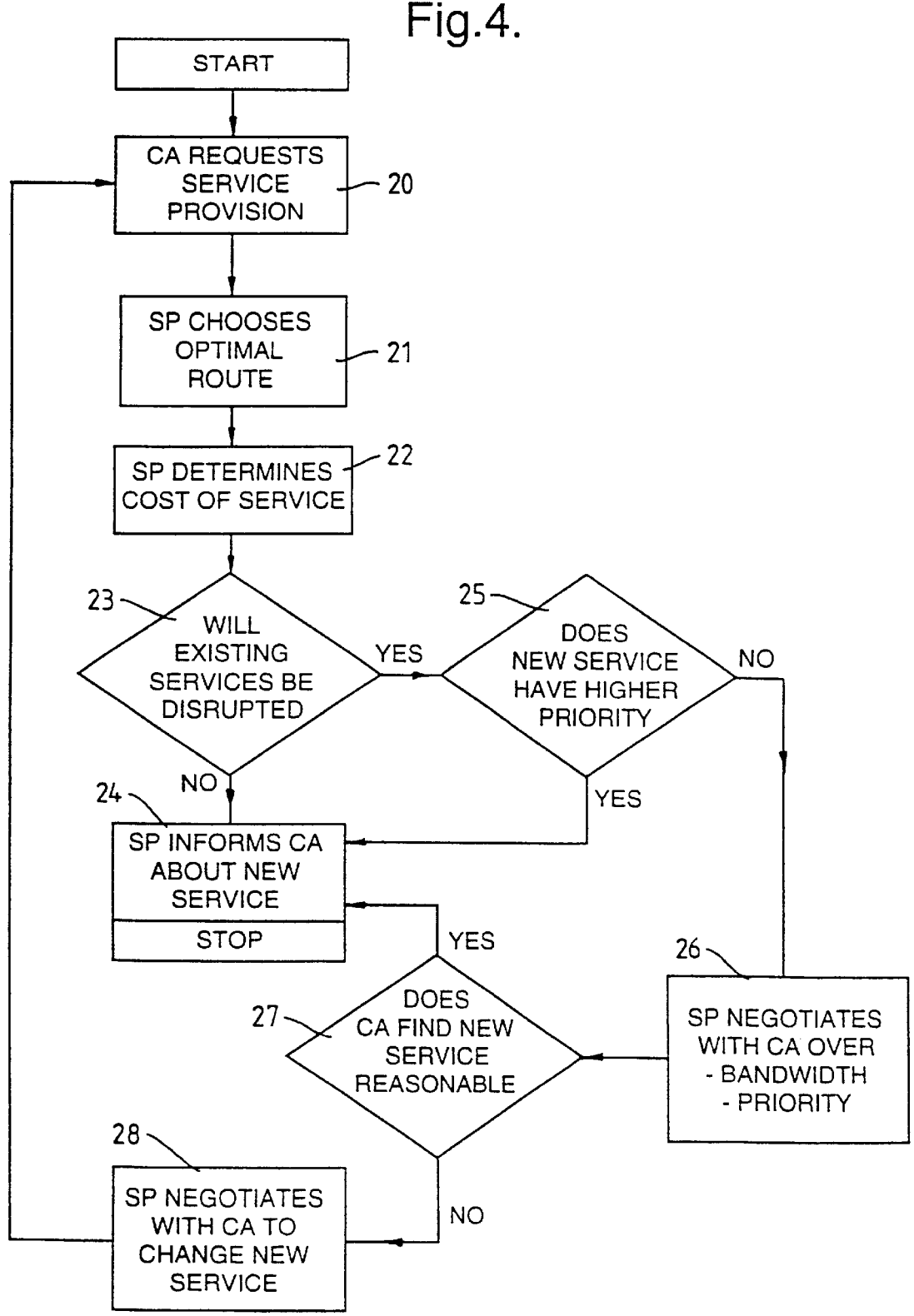
FIG. 4 shows a flow diagram for a negotiation process in service provision in a GMSN 1 as shown in FIG. 1.

A short summary of the negotiation process is given below, with reference to FIG. 4:

START step 20:CA requests that a service be provided step 21, 22:SP chooses the optimal route available in the net work and determines the feasibility and cost of the service, and the services to be disrupted (if any).

step 23:SP determines whether existing services will be disrupted. If not, the system goes to step 24. If they will be disrupted, the system goes to step 25.

step 24:SP informs the CA about the proposed service (cost, route) and stops.

step 25:SP checks if the service requested has a higher priority than the ones to be disrupted. If it does, the system goes back to step 24. If it does not have a higher priority, the system goes to step 26.

step 26:SP negotiates with CA to lower bandwidth requirements OR to increase the service priority (in this model priority is directly proportional to cost)

step 27: a check is made as to whether the CA finds this to be reasonable. If it does, the system goes to step 24. If not, the system goes to step 28.

step 28:SP negotiates with CA to alter the service (step 28), then alters the technical service description and goes back to step 20.

This is a simple example of a SMA-CA interaction process. However, there will be situations that would demand more complexity.

In the foregoing, agents have been considered to be robust and failproof. This is not a realistic assumption, since it is entirely possible that agents could fail. The next section discusses how the remaining agents deal with agent failure.

AGENT FAILURE

The system model described above consists of essentially two networks that interact—the underlying physical communications network (referred to as GMSN network 1) and a network 4 of agents 5, 6 whose function is to manage and control the GMSN 1. To perform these functions the agents have certain responsibilities which in their most general form are of two kinds: Managerial and Contractual. As a Manager 5 the agent has the responsibility of suitably controlling certain nodes 3 and links 2. As a Contractor 6, the agent must ensure provision and maintenance of the services that have been agreed upon.

The stability of the agent network 4 would initially be disrupted when a SMA 5 fails. In such circumstances the normal operation of the agent network 4 breaks down, since, n view of the agendas failure, its responsibilities are unattended thus giving rise to an "abnormal" agent network behaviour. The abnormality lasts unless and until either the failed agent is revived or, if this option cannot be realised promptly, its responsibilities are suitably allocated to its neighbours. Since SMAs' responsibility schedules are modified following the failure of any agents, the system gets renormalised at a new stability threshold.

Concerning the stability threshold, each agent is designed to work during its active life at a certain load level (number of queries to be solved) and it is able to manage theoretically any number of nodes 3. In reality there are limits beyond which the agents control system might not be able to satisfy the performance criteria it was designed for. The stability threshold is the average load (contractual and managerial load) limit beyond which the .system is not able to respond in a stable manner to the queries addressed to it.

Initially we assume there exists an isomorphism between the agent network 4 and the GMSN 1. Therefore, each SMA 5 manages its corresponding node 3 and possibly some of the links 2 incident upon the node 3. Let us assume the failure of a SMA 5 (call it A). The neighbouring SMAs will become aware of A's failure (through detection of alarms) and thus take over A's responsibilities in some fashion. To achieve this, a burst of communications takes place between SMAs 5 who know about A's failure in order to negotiate on the allocation of A's management and contractual responsibilities.

The basis of negotiation among agents 5, 6 is a bid function (F) whose value is computed based on the current state of the network 4. In order to compute the bidding function F four criteria have been considered. Based on those criteria the bidding function F is a weighted sum of some pre-computed parameters (one for each criterion):

$$F = W_1 C + W_2 R + W_3 O + W_4 M$$

where C, R, B and M are Parameters computed for each criterion, as explained below, and $w_1$ to $w_4$ are weights, of which $w_3$ and $w_4$ are negative.

Notations: NA=neighbouring agent; FA=failed agent

CRITERION I: CONNECTIVITY PARAMETER (C)

Assumptions:

[the more links a neighbouring agent $NA_i$ has connected to the FA's nodes the greater is its connectivity C]

[the greater the connectivity C the greater the chance of $NA_i$ to win the bid]

CRITERION II: SERVICE RESPONSIBILITY PARAMETER (R)

Assumptions:

[The more services a neighbouring agent $NA_1$ provisioned using the links that were previously managed by the FA the greater its responsibility R to supervise and maintain those services]

[The greater the responsibility R, the greater the chances of $NA_i$ to win the bid]

CRITERION III: OCCUPANCY (O)

Assumption:

[The more duties a neighbouring agent $NA_i$ has, that is, the greater the number of queries the agent has stared in its queue or incoming messages, the bigger its occupancy O]

[The greater the occupancy, the lesser are the chances for the $NA_i$ to win the bid]

CRITERION IV: MANAGEMENT (M)

Assumption:

[The more a neighbouring agent $NA_i$ is engaged as a manager M, that is, the greater the control it already exercises over nodes 3 and links 2 of the underlying network 4, the less availability it has to be the new manager with respect to the FA's nodes and links]

[The greater the management engagement M, the lesser are the chances for the $NA_i$ to win the bid]

Each SMA aware of A's failure waits sufficiently long to receive messages from other SMAs and the agent with the highest bid function value takes over whatever responsibilities it has bid for. This whole process is triggered each time a SMA fails and proceeds until its responsibilities (both as a manager and a contractor) have been reallocated to the other SMAs aware of its failure.

In an example of the above bidding process, referring again to the Bidding Function F, the weights $w_1$, $w_2$, $w_3$ and $w_4$ can be tuned and are subject to experimental results. However, some structure can be imposed on w. Firstly, $w_1$ and $w_2$ are both positive. Secondly, $w_3$ and $w_4$ are negative, due to their inhibitory effect. Thirdly, the most dominant factor must be the connectivity parameter (C). Therefore the weight w, has been given the value 1.

The other weights have been given the following values:

$$w_2 = 1/\beta$$

where $\beta$=the average number of links connected to a node in the network (fan-out).

$$w_3 = -10/\mu$$

where $\mu$=the total number of nodes in the network.

$w_4$ can be tuned according to the ratio of agents to nodes. A normal range of values would be 0 to −1. The higher the ratio of agents to nodes, the closer $w_4$ will approach to −1, this having the overall effect of spreading management responsibility amongst more agents by increasing the effect on F of M. An expression for $w_4$ might for instance be "1/cluster size", where the cluster size is the average number of nodes managed by one agent. This makes the bid function less sensitive so the real number of nodes managed by one agent (M) when the average cluster size is anyway relatively high.

Thus the bid function may be given as:

$$F = C + 1/\beta R - 1/\mu O + w_1 M$$

SCENARIO

We consider a 10 nodes network with the average fan-out of 4. A, B, C and D are four agents in the control layer and each of them is responsible for a number of nodes 3 as given below. Taking the case of the failure of agent A, while B, C and D are its neighbouring agents:

Failed agent=A

Neighbours=B, C and D

Bidding Formula weights: $w_1=1$, $w_2=\frac{1}{4}$, $w_3=-\frac{1}{10}$ and $w_4=-0.4$

| Agents Details | |
|---|---|
| Agent Name: B | |
| Connectivity (B's nodes to A's nodes) | 5 links |
| Provisioned Services (with A's cooperation) | 8 services |
| Current Queries to be solved | 4 |
| Managed Nodes | 3 |
| Agent Name: C | |
| Connectivity (C's nodes to A's nodes) | 2 links |
| Provisioned Services (with A's cooperation) | 10 services |
| Current Queries to be solved | 5 |
| Managed Nodes | 1 |
| Agent Name: D | |
| Connectivity (B's nodes to A's nodes) | 5 links |
| Provisioned Services (with A's cooperation) | 3 services |
| Current Queries to be solved | 3 |
| Managed Nodes | 5 |

The resultant bidding values are:

for agent B $F = 5 + 0.25*8 - 0.1*4 - 0.4*3 = 5.4$ for agent C $F = 2 + 0.25*10 - 0.1*5 - 0.4*1 = 3.6$ for agent D $F = 5 + 0.25* - 0.1*3 - 0.4*5 = 3.45$ The conclusion is that agent B is the winner, so it will take over the responsibilities of the failed agent A.

Figure 5:
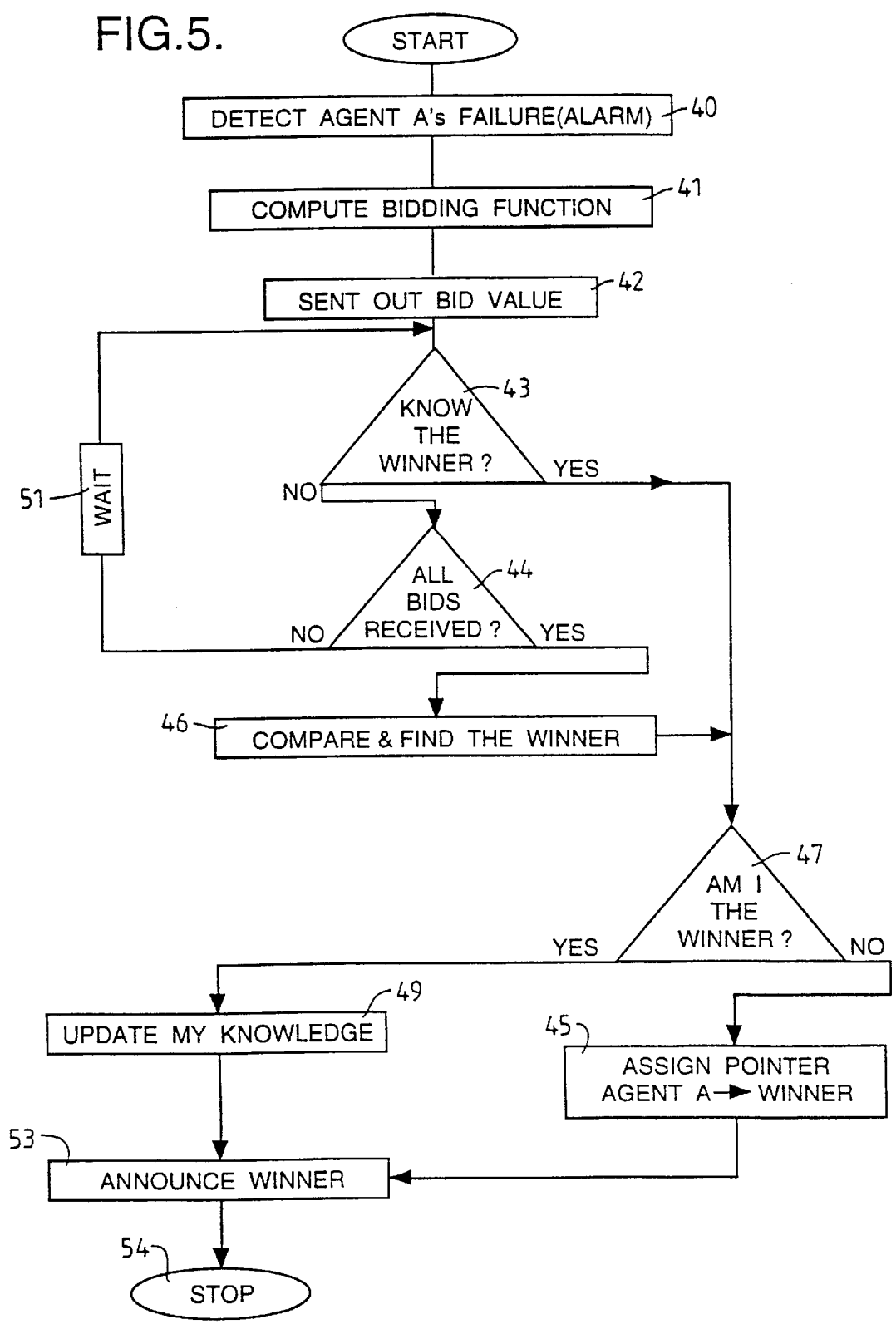
FIG. 5 shows a flow diagram for a bidding process in the event of agent failure in the control network of FIG. 1.

Referring to the FIG. 5, the bidding process described above can be set out in the form of a flow chart. It is triggered when one agent becomes aware of a neighbour s failure (step 40) through detection of alarms. The alarm mechanism may be seen as a simple and continuous check, in which periodically each agent broadcasts a message to its neighbours and then compares the list of agents replying to this message against the list of the neighbours. An agent missing is considered "dead" if and only if a link failure alarm (cut connection) for the communication link with that agent has not been received. The message forwarded to the neighbours may be used to update their knowledge (i.e. sending them the list of current neighbours will help them in the bidding process).

The next step for each agent aware of agent A's failure, is to compute the bidding function F, step 41, and to send out its own bid value (step 42). Taking the example of an agent, agent B, it then goes into a cycle, steps 50, 43, 44, 51, during which it waits for announcements and bids to be received from other neighbouring agents. At step 50, it checks its entry messages for bids received from the other neighbouring agents or for announcements of the winner. At step 43, it makes a decision as to whether the winner has been found. This could be because agent B has received an announcement of the winner from another agent, in its entry messages (step 50). If it has, it comes out of the cycle but, if not, it continues to step 44, which is preparatory to calculating the winner itself. That is, if all bids have been received prom the other neighbouring agents, agent B will again come out of the cycle and this time compare the received bids, together with its own bid, to find the winner, step 46. If all bids have not yet been received, agent B will wait for a reasonable period, step 51, then return to the start of the cycle, step 50.

The two routes out of the cycle, at steps 43 and 44, relate to the cases where another neighbouring agent has received all bids prior to agent B (step 43) and where agent B is apparently the first to receive all the bids and therefore finds the winner on its own account (steps 44, 46).

A further test has to be made in either case, step 47, by agent B to assess whether it itself is the winner since as the winner it must assume the responsibilities of agent A. Thus if agent B finds at step 47 that it is the winner, it will update its knowledge, step 49, consequently taking over the responsibilities of the failed agent A, send an announcement, step 53, to all the other neighbouring agents involved in the bidding, and terminate the process, step 54. If agent 3 is not the winner, agent B updates itself this time by assigning a pointer "agent A—Winner", step 45, to ensure it communicates with the winner in future rather than with agent A. Again, agent B then makes an announcement of the winner, step 53, to all other neighbouring agents involved in the bidding, and terminates the process, step 54.

Figure 6:
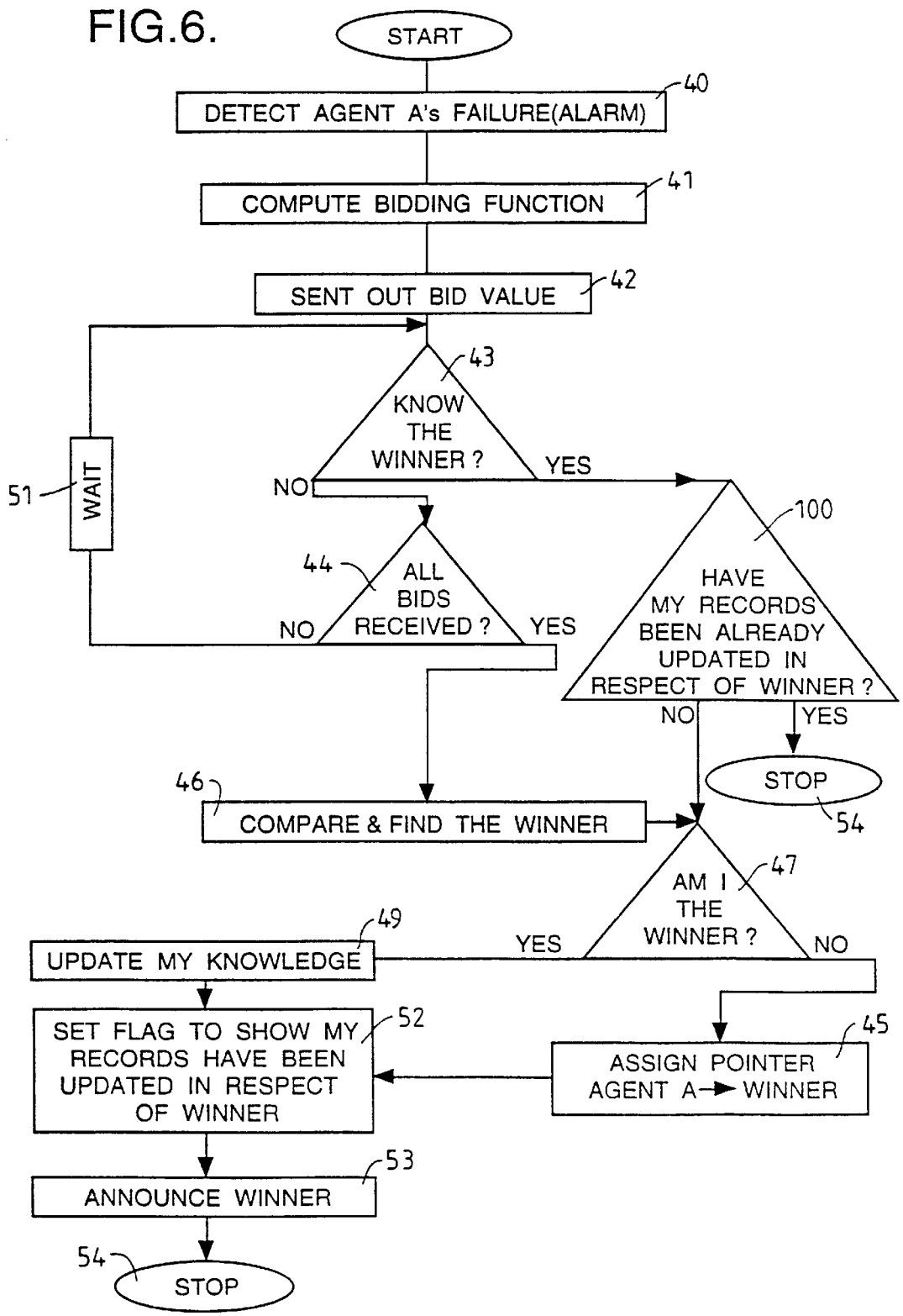
FIG. 6 shows the flow diagram of FIG. 5 with some additional steps.

Referring to FIG. 6, in an alternative version, the process steps followed by the agents might include additional checks which allow them to ensure they have undated themselves appropriately without repeating updating steps 49, 45.

In this version, if agent B knows the winner after reading its entry messages (step 43), it goes to step 100, to make a check whether it has already updated its records in respect of a winner. If it has, it simply goes to STOP (step 54). If it hasn't, it reverts to step 47, and continues substantially as in the version of FIG. 5. In order to supply the information for step 100, however, after steps 49 or 45 (updating own knowledge or assigning a pointer) it sets a flag for itself, step 52, to show it has updated its records in respect of a winner.

The version of FIG. 6 provides for the case where agent B receives all bids (step 44), compares and finds the winner (step 46), then subsequently also receives an announcement of the winner from another agent. In the version of FIG. 6, the subsequent announcement will cause agent B simply to go to STOP (step 54) since the check at step 100 will show its records have already been updated.

The version of FIG. 6 will also deal with the case whether an agent receives an announcement of a winner from more than one neighbouring agent. Again, the extra logic of updating its own records can be avoided on receipt of the second (and subsequent) announcement(s).

There may of course be further alternative processes to the above, without departing from an embodiment of the present invention. For instance, the process steps following START might include checks to avoid repeating a response to alarm messages which have already been dealt with.

In the above description of a bidding process, certain assumptions have been made. These are as follows:
1. An agent can communicate with any other agent in the community using direct or indirect communication.
2. For the sake of simplicity, the bidding algorithm is designed to involve only neighbouring agents still connected through direct links of communication with the failed agent. Those neighbours whose communication links have been previously interrupted would not be able to "read" the agent's failure alarms but they can receive information about the final bidding decision taken by the agents directly connected with the failed agent.

The transfer of responsibilities away from the failed agent might be implemented in one of two ways. The winning agent might for instance gain access to the failed agent's data base from where it is able to extract the information previously owned by the failed agent. This of course is based on the assumption of a valid/accessible data base. A second approach is based on the idea of the "winner" re-building the information stored in the failed agents data base (that is currently not available) through dialogue with the other neighbours of the failed agent. Using this approach it is still possible to recover information, such as connectivity-nodes and links, installed services on failed agent's links etc.

SERVICE RESTORATION

The above describes the response to agent failure in the control layer 4. However nodes 3 and links 2 of the underlying GMSN1 may also fail. When a node 3 fails to operate, all the links 2 incident upon it fail to operate. Hence node failure is equivalent to multi-link failure and thus resolves to the tore basic case of link failure. It therefore suffices to consider the problem of link failure. All the services "running" along the failed link should be detected and re-routed. Re-routing an existing service can itself be regarded as a type of service provisioning.

The restoration procedure adopted applies the same branch and bound routing procedure used for service provision and referred to above.

The failure of a network link 2 causes an alarm message to be sent automatically to the SMA 5 responsible for the link. The SMA 5 then identifies the affected services to be re-routed and places them in its queue to be dealt with in order of their priority. The SMA 5 sends a re-routing request which is similar to the request for a new service (already described), to its neighbours asking them to provide alternative routes around the failed link. The re-routed service is the establishment of a route with the capacity of the disrupted service from the origin (where disruption occurs) to destination (where disruption ends). When the results have been returned to the SMA responsible for the failed link, the lowest cost route is chosen.

In some cases there may not be an alternative route for the service. This may be because:
there are no alternative routes with the required capacity;
the cost limit was too stringent;
insufficient search time was allowed.

Whatever the case, the originating SMA (the agent to which a link failure was signalled) must decide what to do. One simple course of action could be to relax the cost constraints and try again.

It should be noted that although in FIG. 1 there is shown a 1:1 relationship between the SMAs 5 and the nodes 3 of the GMSN 1, this is not necessarily the case. Indeed it is more likely to be found more efficient that there are fewer SMAs 5 than there are nodes 3, each SMA 5 therefore controlling more than one node 3.

It should also be noted that, in the example of the present invention described above, where there is failure of Agent A and Agent B is the winner, Agent B takes over the responsibilities of Agent A. In practice, it may be found more efficient that the responsibilities of Agent A are distributed amongst more than one other agent and the bidding process may therefore alternatively be designed such that remaining agents bid only for selected responsibilities of a failed agent, or that each neighbouring agent puts forward different bid functions in respect of different responsibilities of the failed agent.

In this specification, the term "co-operating intelligent software agents" is used. Without limiting the understanding of a person skilled in the relevant technology, for the purposes of this specification a co-operating intelligent software agent can be considered to be a software entity capable of performing the functions set out, as far as necessary, in an embodiment of the present invention. A relevant software entity would probably therefore comprise a data store, or access to a data store, at least some data (or access to some data) which is local to the software entity rather than global with respect to the communications network(s), intelligence in that it can make decisions and act on them, communications means for communicating with other agents, control outputs for issuing control signals to allocated nodes, and updating means for updating its data.

What is claimed is:

1. A communications network management system, for managing a network which comprises a plurality of nodes connected by traffic links, so as to provide communication services at least in part by allocation of selected links of the network to said services, the management system comprising:

a distributed control system which includes a plurality of software agents, at least one of said agents having control over the configuration of one or more nodes of said plurality of nodes to provide said allocation of selected links, wherein at least two of said agents are each provided with:
a) communication means for communicating with other agents;
b) data storage for storing data which is local to the agent, in respect of the network;
c) updating means for updating data in the data storage;
d) decision-making algorithms for controlling configuration of said one or more nodes;
e) failure detection means for detecting failure of a neighboring agent; and
f) means for outputting a bid value, the distribution control system being configured such that, on failure of an agent, the failure detection means of one or more neighboring agents detects said failure and the communication means of at least one neighboring agent initiates a bidding process determined at least in part by said decision-making algorithms, the neighboring agents outputting bid values based on parameters weighted so as to give, in combination, an estimate of each agent's suitability to take over some or all responsibilities of said failed agent, the neighboring agent outputting a winning bid value thereafter asserting said some or all responsibilities.

2. A communications network management system as in claim 1, wherein there is more than one type of software agent, there being provided service management agents which have direct control outputs to one or more of said nodes of the network, and customer agents, each of which customer agents is associated with at least one service management agent, but has no direct control output to a node of the network.

3. A communications network management system as in claim 1, wherein the bid value "F" for neighboring agent is calculated according to the function:

$$F = w_1 C + w_2 R + w_3 O + w_4 M$$

where C, R, O and M are parameters computed in respect of connectivity, service responsibility, occupancy and management load for that neighboring agent, an $w_1$, $w_2$, $w_3$ and $w_4$ are weighting factors, $w_3$ and $w_4$ being negative.

4. A communication network management system as in claim 3, wherein connectivity is allocated the greatest weighting factor.

5. A network management system according to claim 1, wherein each software agent having control over the configuration of one or more nodes of the network has associated data storage comprising data which is incomplete with respect to the network as a whole, but complete in respect of local data enabling the agent to exercise said control.

6. A method of configuring a communication network in response to a requirement for change in communications services available by means of said network, the network comprising a plurality of configurable nodes connected by links for carrying traffic, and the network being provided with a distributed control system comprising a plurality of software agents, at least one of said agents having control over the configuration of one or more nodes of said network to allocate links to respective services, wherein said software agents are provided with:
a) communication means for communicating with other agents;
b) data storage for storing data which is local to at least one agent, in respect of the network;
c) updating means for updating in the data storage;
d) at least one algorithm for use in configuring the network; and
e) a control output for outputting control signals to a node or nodes, the method comprising the steps of:
 i) receiving an input comprising said requirement for a change at the management system;
 ii) negotiating among at least some of said software agents, by means of said communication means, to determining a node or nodes for configuration to provide said change, using said at least one algorithm; and
 iii) outputting a configuration control signal to the node or nodes so determined, to allocate links to provide said change.

7. A method according to claim 6, wherein said change communication services comprises reconfiguration of said network in order to reinstate services subsequent to failure of one or more elements of said network.

8. A method of managing a communications network for the provision of communications services, said network comprising a plurality of nodes connected by links for carrying communications traffic, and being provided with a management system comprising a community of software agents, at least one of said software agents having control over the configuration of one or more nodes of said plurality of nodes to provide allocation of links to one or more of said services, at least two of said agents being provided with:
a) communication means for communicating with other agents;
b) data storage for storing data which is local to the agent, in respect of the network;
c) updating means for updating data in the data storage;
d) at least one algorithm for use in controlling configuration of said one or more nodes;
e) failure detection means for detecting failure of an agent; and
f) means for outputting a bid values, which method comprises:
 i) detecting failure of a software agent by means of said failure detecting means;
 ii) responding to said failure by initiating a bidding process in said community of software agents, at least one agent outputting a bid value F representing weighted values of parameters relevant to that agent in respect of taking over responsibility of the failed agent;

iii) on completion of said bidding process, identifying the agent which has output the most favorable bid value F; and iv) transferring one or more responsibilities of said failed agent to the identified agent.

9. A method according to claim 8, wherein step iv) includes the downloading of data from said failed agent to the identified agent.

* * * * *